United States Patent
Ooba (12) 
(10) Patent No.: US 6,175,511 B1
(45) Date of Patent: Jan. 16, 2001

(54) UNINTERRUPTABLE POWER SUPPLY

(75) Inventor: Norio Ooba, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/559,829

(22) Filed: Apr. 28, 2000

(30) Foreign Application Priority Data

Dec. 24, 1999 (JP) .................................................. 11-367532

(51) Int. Cl.[7] ................................ H02M 5/44; H02J 7/00

(52) U.S. Cl. .............................. 363/37; 363/124; 307/66

(58) Field of Search .............................. 363/34, 37, 80, 363/124; 307/46, 64, 66

(56) References Cited

U.S. PATENT DOCUMENTS

| | | | | |
|---|---|---|---|---|
| 4,707,774 | * | 11/1987 | Kajita | 363/37 |
| 4,827,151 | * | 5/1989 | Okado | 363/37 X |
| 4,985,819 | * | 1/1991 | Mori et al. | 363/37 |

FOREIGN PATENT DOCUMENTS 7-87686    3/1995   (JP) .

\* cited by examiner

Primary Examiner—Jessica Han
(74) Attorney, Agent, or Firm—Leydig, Voit & Mayer, Ltd.

(57) ABSTRACT

An uninterruptable power supply in which, even if the consumed electric power of a load is increased, the voltage of a D.C. intermediate circuit is not decreased below a set voltage and the input electric power from an A.C. power source is limited to no more than a set value. The uninterruptable power supply includes: a rectifier for converting an alternating current into a direct current; an inverter for converting the direct current into an alternating current output to a load; a stepup/stepdown chopper for charging batteries and for discharging the batteries; a service interruption detector for detecting the service interruption of the A.C. power source; and a control circuit for operating the stepup/stepdown chopper as a stepdown chopper during non-interruption to charge the batteries, and as a boosting chopper to supply direct current with the batteries as the D.C. power source, wherein, when the input electric power exceeds a limit, the stepup/stepdown chopper operates as the boosting chopper to supply electric power from the batteries, reducing the electric power input from the A.C. power source.

7 Claims, 7 Drawing Sheets

UNINTERRUPTABLE POWER SUPPLY

BACKGROUND OF THE INVENTION

1. Field of the Invention

The present invention relates to a uninterruptive power supply for supplying uninterrupted A.C. power to a load.

2. Description of the Related Art

Figure 7:
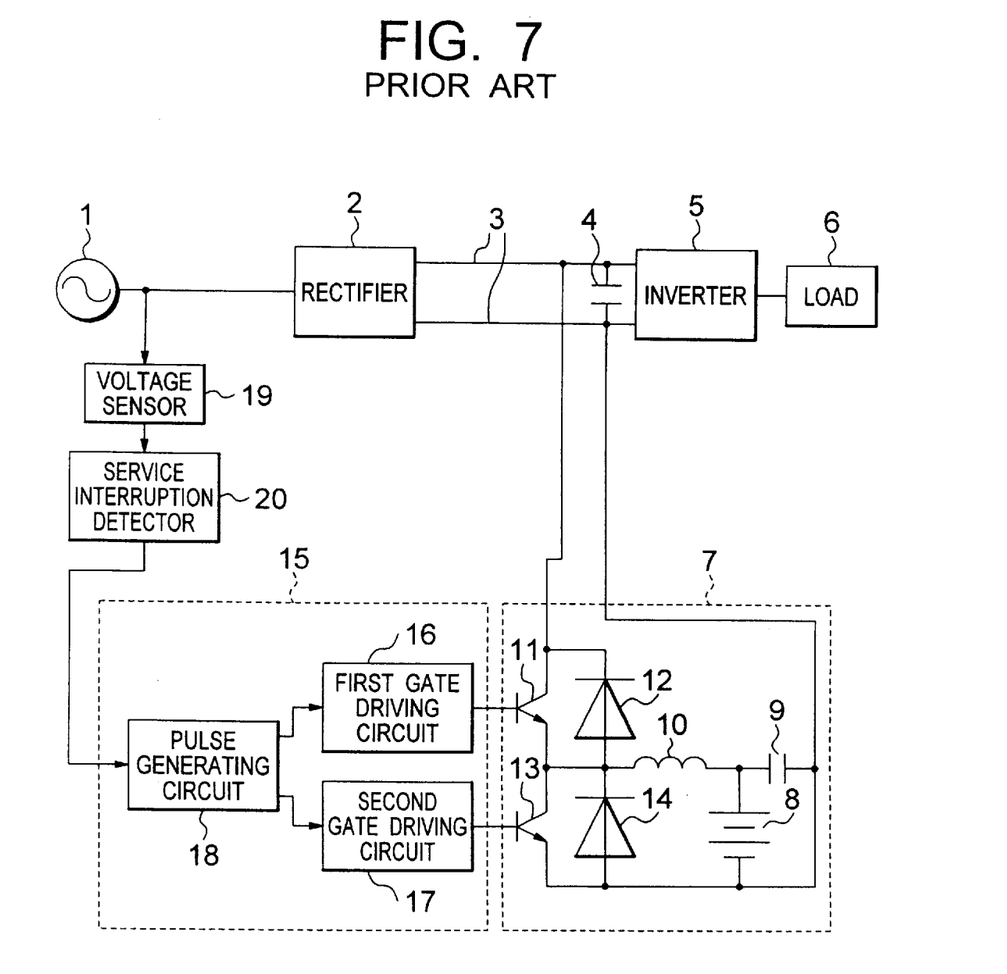
FIG. 7 is a circuit diagram, partly in block diagram, showing the configuration of a conventional uninterruptive power supply.

FIG. 7 is a circuit diagram, partly in block diagram, showing the configuration of a conventional uninterruptive power supply which is disclosed in Japanese Patent Application Laid-Open No. Hei 7-87686 for example.

In FIG. 7, reference numeral 1 designates an A.C. power source, reference numeral 2 designates a rectifier for rectifying an alternating current from the A.C. power source 1 into a direct current, reference numeral 3 designates a D.C. intermediate circuit which is connected to a D.C. output of the rectifier 2, reference numeral 4 designates a smoothing capacitor for smoothing the voltage developed across the D.C. intermediate circuit 3, reference numeral 5 designates an inverter for converting a direct current from the D.C. intermediate circuit 3 into an alternating circuit, and reference numeral 6 designates a load.

Reference numeral 7 designates a stepup/stepdown chopper for supplying the electric charges from the D.C. intermediate circuit 3 to batteries 8 and for discharging electric charge from the batteries 8 to the D.C. intermediate circuit 3. The stepup/stepdown chopper 7 includes the batteries 8 having the lower voltage than the voltage across the D.C. intermediate circuit 3, a smoothing capacitor 9, a chopper reactor 10, a first transistor 11, a first free wheel diode 12, a second transistor 13 and a second free wheel diode 14.

In addition, reference numeral 15 designates a chopper controlling circuit for operating the above-mentioned stepup/stepdown chopper 7 as the stepdown chopper during the non-interruption to charge the above-mentioned batteries 8, while for operating the above-mentioned stepup/stepdown chopper 7 as the boosting chopper during the detection of the service interruption to supply the direct current to the above-mentioned D.C. intermediate circuit 3 with the above-mentioned batteries 8 as the D.C. power source. The chopper controlling circuit 15 includes a first gate driving circuit 16, a second gate driving circuit 17, and a pulse generating circuit 18 for outputting the gate pulse to the first gate driving circuit 16 and the second gate driving circuit 17 depending on whether or not the service interruption has been detected. In addition, reference numeral 19 designates a voltage sensor for detecting the voltage of the A.C. power source 1, and reference numeral 20 designates a service interruption detector for detecting the service interruption of the A.C. power source 1 on the basis of the output of the voltage sensor 19.

Next, the operation will hereinbelow be described.

Normally, the rectifier 2 rectifies the alternating current from the A.C. power source 1 into the direct current to output the resultant direct current to the D.C. intermediate circuit 3. The inverter 5 converts the direct current from the D.C. intermediate circuit 3 into the alternating current to apply the resultant A.C. output to the load 6.

At this time, if the service interruption detector 20 for detecting the service interruption of the A.C. power source 1 has not detected the service interruption on the basis of the output from the voltage sensor 19 for detecting the voltage of the A.C. power source 1, then the pulse generating circuit 18 outputs the pulse to the first gate driving circuit 16 in such a way that the first transistor 11 carries out repeatedly the ON/OFF operation.

That is, at the time when the pulse generating circuit 18 has operated the first gate driving circuit 16 to turn ON the first transistor 11 on the basis of the gate signal from the first gate driving circuit 16, the charging current is caused to flow into the batteries 8 through the path of the D.C. intermediate circuit 3→the first transistor 11 the chopper reactor 10→the batteries 8→the D.C. intermediate circuit 3. Next, at the time when the first transistor 11 has been turned OFF, the current which has been caused to flow through the chopper reactor 10 circulates through the path of the chopper reactor 10→the batteries 8→the second free wheel diode 14→the chopper reactor 10 so that the stepup/stepdown chopper 7 operates as the well known stepdown chopper including the first transistor 11, the chopper reactor 10, and the second free wheel diode 14 with the D.C. intermediate circuit 3 as the D.C. power source to charge the batteries 8.

On the other hand, at the time when the service of the A.C. power source 1 has been interrupted, the service interruption detector 20 outputs the signal to the pulse generating circuit 18 which outputs, in turn, the pulse to the second gate driving circuit 17 in such a way that the second transistor 13 carries out repeatedly the ON/OFF operation.

That is, at the time when the pulse generating circuit 18 has operated the second gate driving circuit 17 to turn ON the second transistor 13 on the basis of the gate signal from the second gate driving circuit 17, the current is increasingly caused to flow through the path of the batteries 8→the chopper reactor 10→the second transistor 13→the batteries 8 with the batteries 8 as the power source. Next, at the time when the second transistor 13 is turned OFF, the current is caused to flow through the path of the chopper reactor 10→the first free wheel diode 12→the D.C. intermediate circuit 3→the inverter 5 and hence the stepup/stepdown chopper 7 operates as the well known boosting chopper including the second transistor 13, the chopper reactor 10, and the first free wheel diode 12 with the batteries 8 as the D.C. power source to supply the direct current to the D.C. intermediate circuit 3 so that the inverter 5 supplies the alternating current to the load 6 in the uninterruptive manner.

Since the conventional uninterruptive power supply is configured as described above, the power source for supplying the load 6 with the electric power is either the A.C. power source 1 in the normal case, or the batteries 8 when the service interruption occurs. Therefore, there arises the problem in that the power consumption of the load 6 is increased, and hence when exceeding the supply ability of the A.C. power source 1 or adjusting the demand electric power on the A.C. power source 1 side, the electric power supplied from the A.C. power source 1, i.e., the input of the rectifier 2 can not be limited.

SUMMARY OF THE INVENTION

The present invention has been made in order to solve the above-mentioned problems, and therefore has an object to obtain a uninterruptive power supply which is capable of limiting the A.C. input and also of supplying the predetermined electric power from an inverter.

In order to attain the above-mentioned object, according to one aspect of the present invention, there is provided a uninterruptive power supply including: an A.C. power source; an input filter for smoothing an A.C. current from the A.C. power source; a rectifier for converting an alternating current which has been inputted through the input filter into a direct current to output the resultant direct current to a D.C. intermediate circuit; an inverter for converting a direct current which has been inputted through the D.C. intermediate circuit into an alternating current to output the resultant alternating current to a load; a stepup/stepdown chopper having batteries for charging the electric charges through a chopper reactor from the D.C. intermediate circuit to the batteries and for discharging the electric charges from the batteries to the D.C. intermediate circuit through the chopper reactor; an A.C. power source voltage detecting means for detecting the voltage of the A.C. power source; service interruption detecting means for detecting the service interruption on the basis of the voltage detected by the voltage detecting means; and control means for operating the stepup/stepdown chopper as the stepdown chopper during the non-interruption on the basis of the signal detected by the service interruption detecting means to charge the batteries, while for operating the stepup/stepdown chopper as the boosting chopper during the detection of the service interruption to supply the direct current to the D.C. intermediate circuit with the batteries as the D.C. power source, characterized in that the control means, when the input electric power inputted from the A.C. power source exceeds the electric power for the limitation, operates the stepup/stepdown chopper as the boosting chopper to supply a part of the electric power which is supplied from the inverter to the load from the batteries, thereby suppressing the input electric power from the A.C. power source.

In addition, according to another aspect of the present invention, the uninterruptive power supply further includes a D.C. intermediate circuit voltage detecting means for detecting the voltage developed across the D.C. intermediate circuit, characterized in that the control means detects on the basis of the voltage detected by the D.C. intermediate circuit voltage detecting means that the input electric power which has been inputted from the A.C. power source exceeds the electric power for the limitation.

In addition, according to still another aspect of the present invention, the uninterruptive power supply further includes: a D.C. intermediate circuit voltage detecting means for detecting the voltage developed across the D.C. intermediate circuit; current detecting means for detecting the current which has been outputted by the rectifier; and input electric power detecting means for detecting the input electric power by multiplying the voltage detected by the D.C. intermediate circuit voltage detecting means by the current detected by the current detecting means, characterized in that the control means detects on the basis of the electric power detected by the input electric power detecting means that the input electric power which has been inputted from the A.C. power source exceeds the electric power for the limitation.

In addition, according to a still another aspect of the present invention, the uninterruptive power supply further includes: a D.C. intermediate circuit voltage detecting means for detecting the voltage of the D.C. intermediate circuit; and input electric power detecting means for detecting the input electric power on the basis of the voltage detected by the D.C. intermediate circuit voltage detecting means, the voltage detected by the A.C. power source voltage detecting means, and the impedance of the input filter, characterized in that the control means detects on the basis of the electric power detected by the input electric power detecting means that the input electric power which has been inputted from the A.C. power source exceeds the electric power for the limitation.

In addition, according to a still another aspect of the present invention, the uninterruptive power supply further includes: inverter output voltage detecting means for detecting the output voltage of the inverter; inverter output current detecting means for detecting the output current of the inverter; inverter output electric power detecting means for detecting the output electric power of the inverter by multiplying the voltage detected by the inverter output voltage detecting means by the current detected by the inverter output current detecting means; battery output voltage detecting means for detecting the output voltage of the batteries; battery output current detecting means for detecting the output current of the batteries; and battery output electric power detecting means for detecting the output electric power of the batteries by multiplying the voltage detected by the battery output voltage detecting means by the current detected by the battery output current detecting means, characterized in that the control means detects on the basis of the sum of the electric power detected by the inverter output electric power detecting means and the electric power detected by the battery output electric power detecting means that the input electric power which has been inputted from the A.C. power source exceeds the electric power for the limitation.

In addition, according to a still further aspect of the present invention, it is characterized in that the stepup/stepdown chopper includes switching means provided between the batteries and the chopper reactor for the protection against the overcurrent, and circulation means for making the current, which is caused to flow due to the energy which has been accumulated in the chopper reactor in the opening of the switching means, circulate through the D.C. intermediate circuit.

In addition, according to a still another aspect of the present invention, the stepup/stepdown chopper includes, as the chopper reactors, a charging chopper reactor which is provided in the charging path leading to the batteries and a discharging chopper reactor which is provided in the discharging path leading to the D.C. intermediate circuit, characterized in that the inductance of the charging chopper reactor is set to a large value, while the inductance of the discharging chopper reactor is set to a small value.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

The preferred embodiments of the present invention will hereinafter be described in detail with reference to the accompanying drawings.

(First Embodiment)

Figure 1:
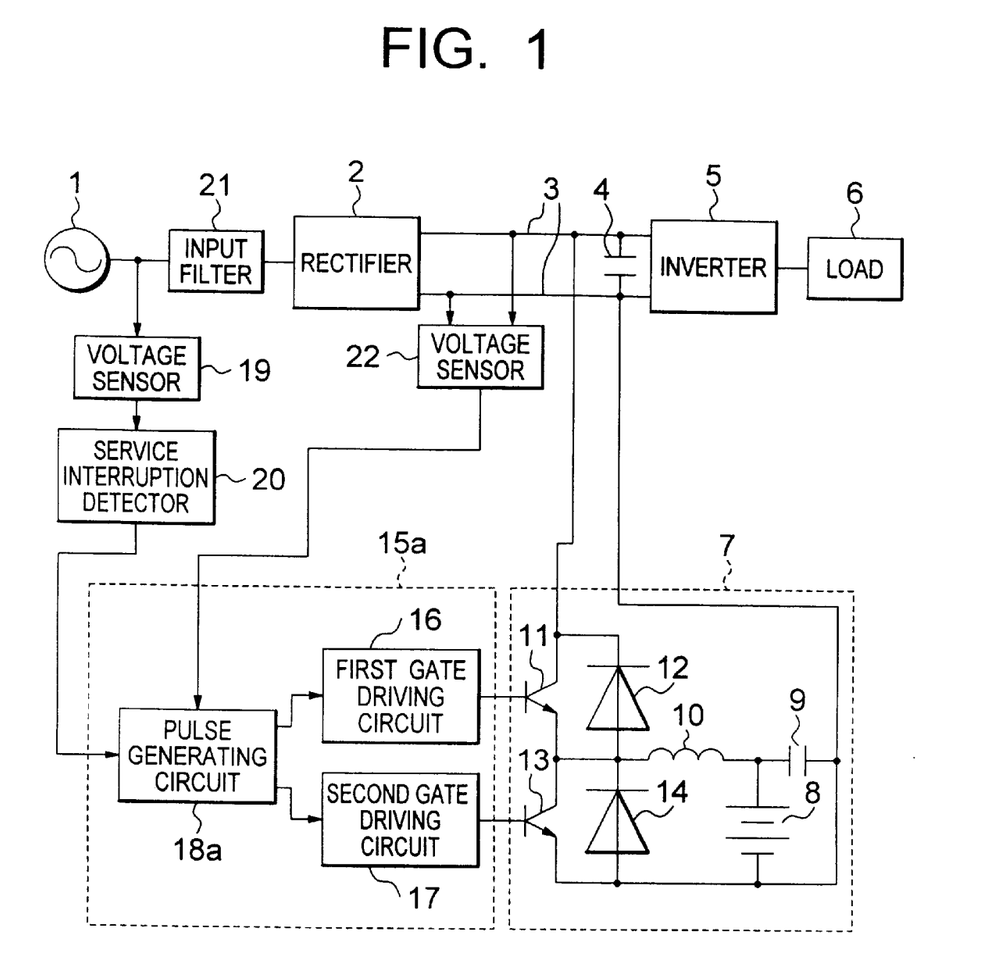
FIG. 1 is a circuit diagram, partly in block diagram, showing the configuration of a uninterruptive power supply according to a first embodiment of the present invention.

FIG. 1 is a circuit diagram, partly in block diagram, showing the configuration of a uninterruptive power supply according to a first embodiment of the present invention.

In FIG. 1, the same portions as those in the conventional example shown in FIG. 7 are designated by the same reference numerals and the description thereof is omitted here for the sake of simplicity. As for new reference numerals, reference numeral 21 designates an input filter which includes a reactor or both of a reactor and a capacitor for smoothing the A.C. current inputted to the rectifier 2 including the diodes from the A.C. power source 1, reference numeral 22 designates a voltage sensor for detecting the D.C. voltage of the D.C. intermediate circuit 3, and reference numeral 15a designates a chopper control circuit according to the first embodiment. The chopper control circuit 15a includes the first gate driving circuit 16 and the second gate driving circuit 17 which are the same in the configuration as those in the conventional example shown in FIG. 7, and also a pulse generating circuit 18a for outputting the gate pulse to the first gate driving circuit 16 and the second gate driving circuit 17 in accordance with the outputs of the service interruption detector 20 and the voltage sensor 22.

Now, the above-mentioned pulse generating circuit 18a is configured in such a way as to detect on the basis of the voltage detected by the voltage sensor 22 that the input electric power which has been inputted from the A.C. power source 1 exceeds the electric power to be limited and in the detection thereof, to operate the stepup/stepdown chopper 7 as the boosting chopper to supply the exceeded electric power in the form of the D.C. electric power from the batteries 8 to the inverter 5 through the D.C. intermediate circuit 3. Also, the pulse generating circuit 18a is configured in such a way as to control the voltage of the D.C. intermediate circuit 3 to suppress the input electric power from the A.C. power source 1.

The input electric power from the A.C. power source 1 can be determined on the basis of the impedance of the input filter 21, the voltage of the A.C. power source 1 and the voltage of the A.C. intermediate circuit 3, it can be detected on the basis of the voltage of the D.C. intermediate circuit 3 detected by the voltage sensor 22 that ihe input electric power which has been inputted from the A.C. power source 1 exceeds the electric power to be limited, from the fact that the input electric power from the A.C. power source 1 becomes large as the voltage of the D.C. intermediate circuit 3 becomes lower, in other words, the voltage of the D.C. intermediate circuit 3 becomes low if the consumed electric power of the load 6 becomes large. In the detection thereof, the stepup/stepdown chopper 7 is operated as the boosting chopper to supply the exceeded electric power in the form of the D.C. electric power from the batteries 8 to the inverter 5 through the D.C. intermediate circuit 3, thereby being able to suppress the input electric power from the A.C. power source 1.

Next, the operation will hereinbelow be described.

A pulse generating circuit 18a, when the service interruption detector 20 has outputted the service interruption signal, outputs the same pulse as that in the conventional uninterruptive power supply shown in FIG. 7 to the second gate driving circuit 17. On the other hand, when the service interruption detector 20 does not output the service interruption signal and also the detected voltage of the D.C. intermediate circuit 3 which has been outputted by the voltage sensor 22 is higher than the setting voltage, the pulse generating circuit 18a outputs the same pulse as that in the conventional uninterruptive power supply to the first gate driving circuit 16. In addition, when the service interruption detector 20 does not output the service interruption signal and also the voltage of the D.C. intermediate circuit 3 which has been outputted by the voltage sensor 22 is lower than the setting voltage, the pulse generating circuit 18a outputs the pulse, which has been determined in accordance with the magnitude of the deviation in such a way that the deviation between the setting voltage and the voltage of the D.C. intermediate circuit 3 becomes zero, to either the first gate driving circuit 16 or the second gate driving circuit 17. The setting voltage of the D.C. intermediate circuit 3 on the basis of which the operation of the pulse generating circuit 18a is switched can be uniquely obtained from the electric power supplied from the A.C. power source 1 which is to be limited, the known voltage of the A.C. power source 1 and the impedance of the input filter 20.

If the pulse generating circuit 18a which is operated as described above is employed, then the same function as that in the conventional uninterruptive power supply can be attained in which in the normal operation, the A,C. power source is supplied to the load 6 on the basis of the electric power supplied from the A.C. power source 1, and the first transistor 11 is turned ON or OFF to charge the batteries 8, while when the service of the A.C. power source 1 is interrupted, the second transistor 13 is turned ON or OFF to supply the load 6 with the A,C. power source on the basis of the electric power supplied from the batteries 8.

In addition to that function, if it is detected from the deviation between the voltage of the D.C. intermediate circuit 3 and the setting voltage that the sum of the consumed electric power of the load 6 and the charging electric power for the batteries 8 exceeds the electric power of the A.C. input to be limited, then when the voltage of the D.C. intermediate circuit 3 is lower than the setting voltage, since the input voltage to be limited is exceeded, first of all, the pulse generating circuit 18a outputs the pulse to the first gate driving circuit 16 in such a way as to stop the charge for the batteries 8. When there is still the deviation for all that, i.e., when if the charge for the batteries 8 is stopped, the voltage of the D.C. intermediate circuit 3 is increased, but when the consumed electric power of the load 6 is large and also the D.C. voltage is lower than the setting voltage, the pulse generating circuit 18a outputs the pulse to the second gate driving circuit 17 to turn ON the second transistor 13 to operate the stepup/stepdown chopper 7 as the boosting chopper, thereby making the deviation zero.

Therefore, according to the above-mentioned first embodiment, even if the consumed electric power of the load 6 is increased, the voltage of the D.C. intermediate circuit 3 does not lower than the setting voltage, and the input electric power from the A.C. power source 1 can be limited to the level equal to or lower than the setting electric power.

(Second Embodiment)

While in the above-mentioned first embodiment, the description has been given with respect to the case where in order to limit the input electric power from the A.C. power source 1, the operation of the pulse generating circuit is switched on the basis of only the detected voltage of the D.C. intermediate circuit 3 which has been outputted by the voltage sensor 22, when the power source voltage of the A.C. power source 1 fluctuates, the input electric power can not be detected on the basis of only the voltage of the D.C. intermediate circuit 3. Then, in a second embodiment, there is provided a uninterruptive power supply in which even if the voltage of the A. C. power source 1 fluctuates, the input electric power does not exceed the setting electric power and hence the input electric power from the A.C. power source 1 can be limited.

Figure 2:
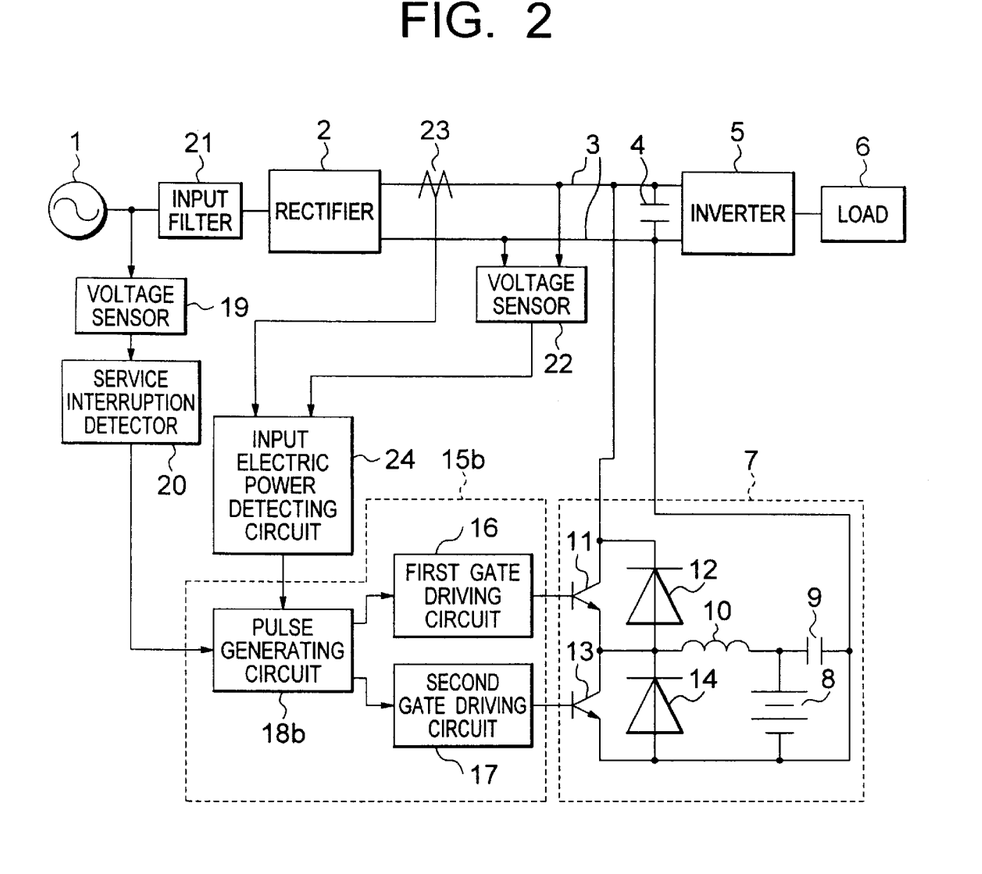
FIG. 2 is a circuit diagram, partly in block diagram, showing the configuration of a uninterruptive power supply according to a second embodiment of the present invention.

FIG. 2 is a circuit diagram, partly in block diagram, showing the configuration of a uninterruptive power supply according to the second embodiment of the present invention.

In FIG. 2, the same portions as those of the first embodiment shown in FIG. 1 are designated by the same reference numerals and the description thereof is omitted here for the sake of simplicity. As for new reference numerals, reference numeral 23 designates a current sensor for detecting the current which has been outputted by the rectifier 2, and reference numeral 24 designates an input electric power detecting circuit for detecting the input electric power by multiplying the detected current which has been outputted by the current sensor 23 by the voltage of the D.C. intermediate circuit 3 which has been outputted by the voltage sensor 22.

Then, a pulse generating circuit 18b in the second embodiment is configured in such a way as to detect on the basis of the electric power detected by the above-mentioned input electric power detecting circuit 24 that the input electric power which has been inputted from the A.C. power source exceeds the electric power to be limited. When the service interruption detector 20 does not output the service interruption signal and also the input electric power which has been outputted by the input electric power detecting circuit 24 is higher than the setting electric power, the pulse generating circuit 18b outputs the pulse, which has been determined in accordance with the magnitude of the deviation, in such a way that the deviation between the setting electric power and the input electric power becomes zero to either the first gate driving circuit 16 or the second gate driving circuit 17.

When the uninterruptive power supply is configured in the manner as described above, if the input electric power which has been outputted from the input electric power detecting circuit 24 to be inputted to the pulse generating circuit 18b exceeds the setting electric power of the A.C. input to be limited, then the pulse generating circuit 18b, first of all, outputs the pulse to the first gate driving circuit in such a way as to stop the charge for the batteries 8. When there is still the deviation for all that, the pulse generating circuit 18b outputs the pulse to the second gate driving circuit in such a way that the deviation becomes zero.

Therefore, according to the second embodiment, even when the voltage of the A.C. power source 1 fluctuates, the input electric power does not exceed the setting electric power, and hence the input electric power from the A.C. power source 1 can be limited.

(Third Embodiment)

While in the above-mentioned second embodiment, the description has been given with respect to the case where the input electric power is detected by multiplying the voltage which has been outputted by the rectifier 2 by the current which has been outputted by the rectifier 2, the current sensor 23 for detecting the current which has been outputted by the rectifier 2 needs to be provided. In a third embodiment, there is provided a uninterruptive power supply which is inexpensive without requiring the current sensor 23.

Figure 3:
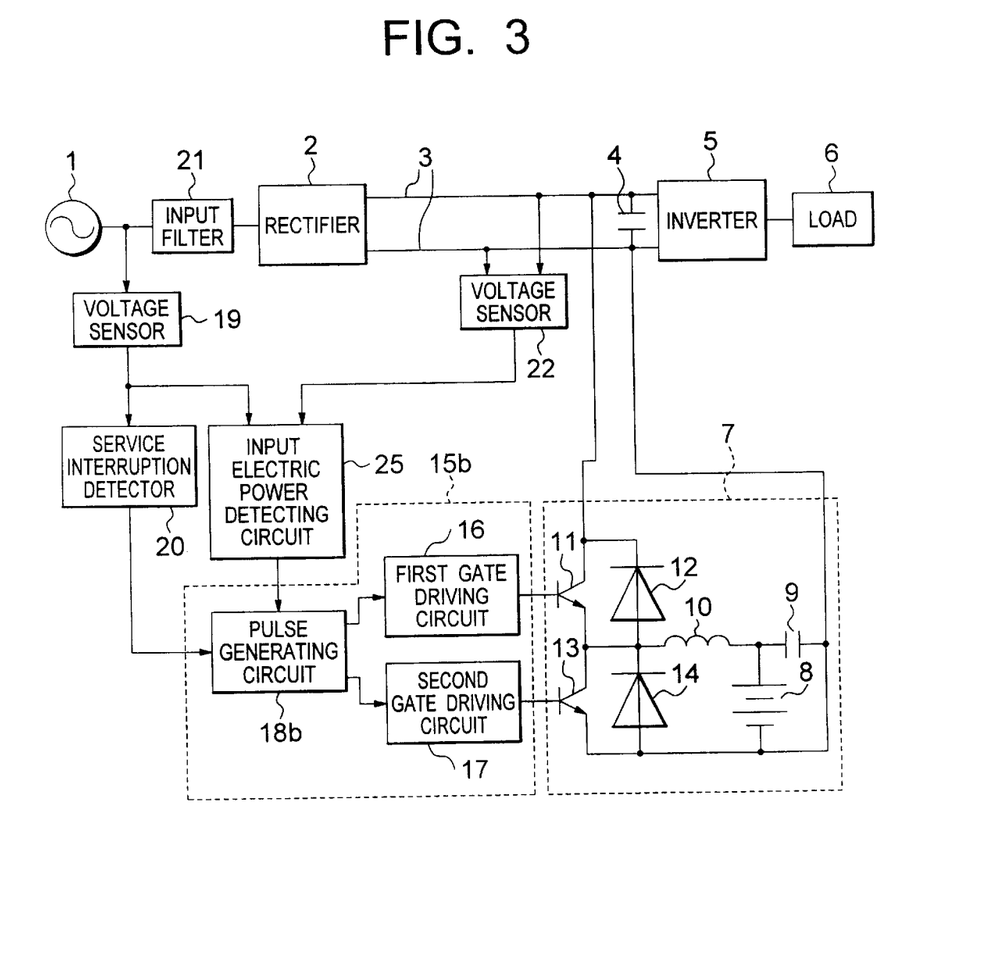
FIG. 3 is a circuit diagram, partly in block diagram, showing the configuration of a uninterruptive power supply according to a third embodiment of the present invention.

FIG. 3 is a circuit diagram, partly in block diagram, showing the configuration of a uninterruptive power supply according to the third embodiment of the present invention.

In FIG. 3, the same portions as those of the second embodiment shown in FIG. 2 are designated by the same reference numerals and the description thereof is omitted here for the sake of simplicity. As for new reference numerals, reference numeral 25 designates an input electric power detecting circuit for detecting the input electric power on the basis of the voltage of the D.C. intermediate circuit 3 which has been detected by the voltage sensor 22, the voltage of the A.C. power source 1 which has been detected by the voltage sensor 19, and the impedance of the input filter 21. Also, the pulse generating circuit 18b according to the third embodiment is configured in such a way as to detect on the basis of the electric power detected by the input electric power detecting circuit 25 that the input electric power which has been inputted from the A.C. power source exceeds the electric power to be limited.

In the third embodiment, the input electric power detecting circuit 25, as shown in FIG. 3, is configured in such a way as to receive as its input the voltage of the D.C. intermediate circuit 3 which has been outputted by the voltage sensor 22 and the voltage of the A.C. power source 1 which has been outputted by the voltage sensor 19 to detect the input electric power with the voltage of the A.C. power source 1, the voltage of the D.C. intermediate circuit 3 and the impedance of the input filter 20 as the parameters. The pulse generating circuit 18b detects on the basis of the detected electric power which has been outputted by the input electric power detecting circuit 25 whether or not the input electric power which has been inputted from the A.C. power source 1 exceeds the setting electric power of the A.C. input to be limited. For this reason, the current sensor which was employed in the second embodiment and serves to detect the current which has been outputted by the rectifier 2 becomes unnecessary and hence the uninterruptive power supply becomes inexpensive and also is operated in the same manner as that in the second embodiment.

(Fourth Embodiment)

While in the first to third embodiments, the description has been given with respect to the case where the input electric power is detected and the chopper is operated in such a way that the input electric power does not exceed the electric power to be limited, in a fourth embodiment, the description will hereinbelow be given with respect to the case where the output electric power of the inverter 5 and the output electric power of the batteries 8 are both detected, it is detected on the basis of the relation between the two detected electric powers and the electric power of the A.C. power source 1 to be limited whether or not the input electric power which has been inputted from the A.C. power source 1 exceeds the electric power to be limited, and then the operation of the pulse generating circuit is switched.

Figure 4:
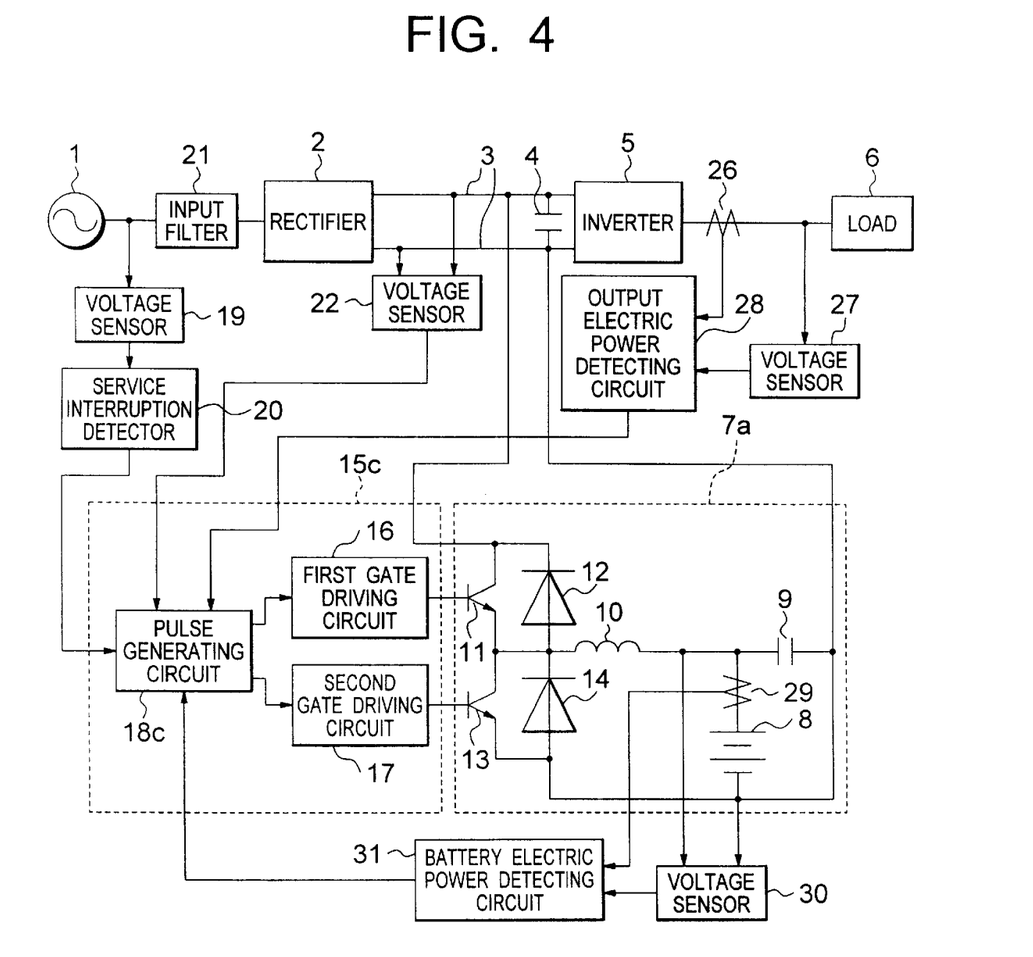
FIG. 4 is a circuit diagram, partly in block diagram, showing the configuration of a uninterruptive power supply according to a fourth embodiment of the present invention.

FIG. 4 is a circuit diagram, partly in block diagram, showing the configuration of a uninterruptive power supply according to the fourth embodiment of the present invention.

In FIG. 4, the same portions as those of the first embodiment shown in FIG. 1 are designated by the same reference numerals and the description thereof is omitted here for the sake of simplicity. As for new reference numerals, reference numeral 26 designates a current sensor for detecting the output current from the inverter 5, reference numeral 27 designates a voltage sensor for detecting the output voltage from the inverter 5, reference numeral 28 designates an output electric power detecting circuit for detecting the output electric power of the inverter by multiplying the output of the current sensor 25 by the output of the voltage sensor, reference numeral 29 designates a current sensor for detecting the output current of the batteries 8 within a stepup/stepdown chopper 7a according to the fourth embodiment, reference numeral 30 designates a voltage sensor for detecting the voltage of the batteries 8, and reference numeral 31 designates a battery electric power detecting circuit for detecting the output electric power of the batteries 8 by multiplying the output of the current sensor 29 by the output of the voltage sensor 30. Also, a pulse generating circuit 18c according to the fourth embodiment is configured in such a way as to detect on the basis of the sum of the electric power of the inverter 5 detected by the output electric power detecting circuit 28 and the electric power detected by the battery electric power detecting circuit 31 whether or not the input electric power which has been inputted from the A.C. power source 1 exceeds the electric power to be limited. In this connection, with respect to the electric power of the batteries 8, the charging direction for the batteries 8 is made positive, and the discharging direction thereof is made negative.

In the fourth embodiment configured as shown in FIG. 4, when the service interruption detector 20 does not output the service interruption signal, and also the sum of the output electric power which has been outputted by the output electric power detecting circuit 28 and the battery electric power which has been outputted by the battery electric power detecting circuit 31 is higher than the setting electric power, the pulse generating circuit 18c outputs the pulse, which has been determined in accordance with the magnitude of the deviation in such a way that the deviation between the sum of the output electric power and the battery electric power, and the setting electric power becomes zero, to either the first gate driving circuit 16 or the second gate driving circuit 17.

That is, at the time when the sum of the output electric power which has been outputted by the output electric power detecting circuit 28 to be inputted to the pulse generating circuit 18c and the battery electric power which has been outputted by the battery electric power detecting circuit 31 exceeds the setting electric power of the A.C. input to be limited, the pulse generating circuit 18c, first of all, outputs the pulse to the first gate driving circuit 16 so as to stop the charge for the batteries 8. When the electric power has still the deviation for all that, the pulse generating circuit 18c outputs the pulse to the second gate driving circuit 17 in such a way that the deviation becomes zero. In such a manner, the input electric power from the A.c. power source 1 can be limited.

Now, the current sensors 26 and 29, the voltage sensors 27 and 30, and the electric power detecting circuits 28 and 31, for the measurement display or for the control of the inverter, are essential to the general uninterruptive power supply. Then, any of new constituent elements is not newly added, but those constituent elements are applied thereto, whereby the configuration of the circuit can be simplified.

(Fifth Embodiment)

While in the above-mentioned first to fourth embodiments, the description has been given with respect to the case where the smoothing capacitor 9 is provided in order to smooth the voltage of the batteries 8. Then, since even when the batteries 8 are removed due to the maintenance of the uninterruptive power supply or the exchange of the batteries 8, the same voltage as that of the batteries 8 still remains across the smoothing capacitor 9 and hence this is dangerous, the electric charges accumulated therein needs to be discharged. However, each of the batteries 8 has the capacitance component of the capacitor and hence if the voltage of the batteries 8 can be smoothed through the capacitance component thereof, then the smoothing capacitor 9 can be omitted. In the fifth embodiment, the description will hereinbelow be given with respect to a uninterruptive power supply including a stepup/stepdown chopper in which the smoothing capacitor 9 is omitted.

Figure 5:
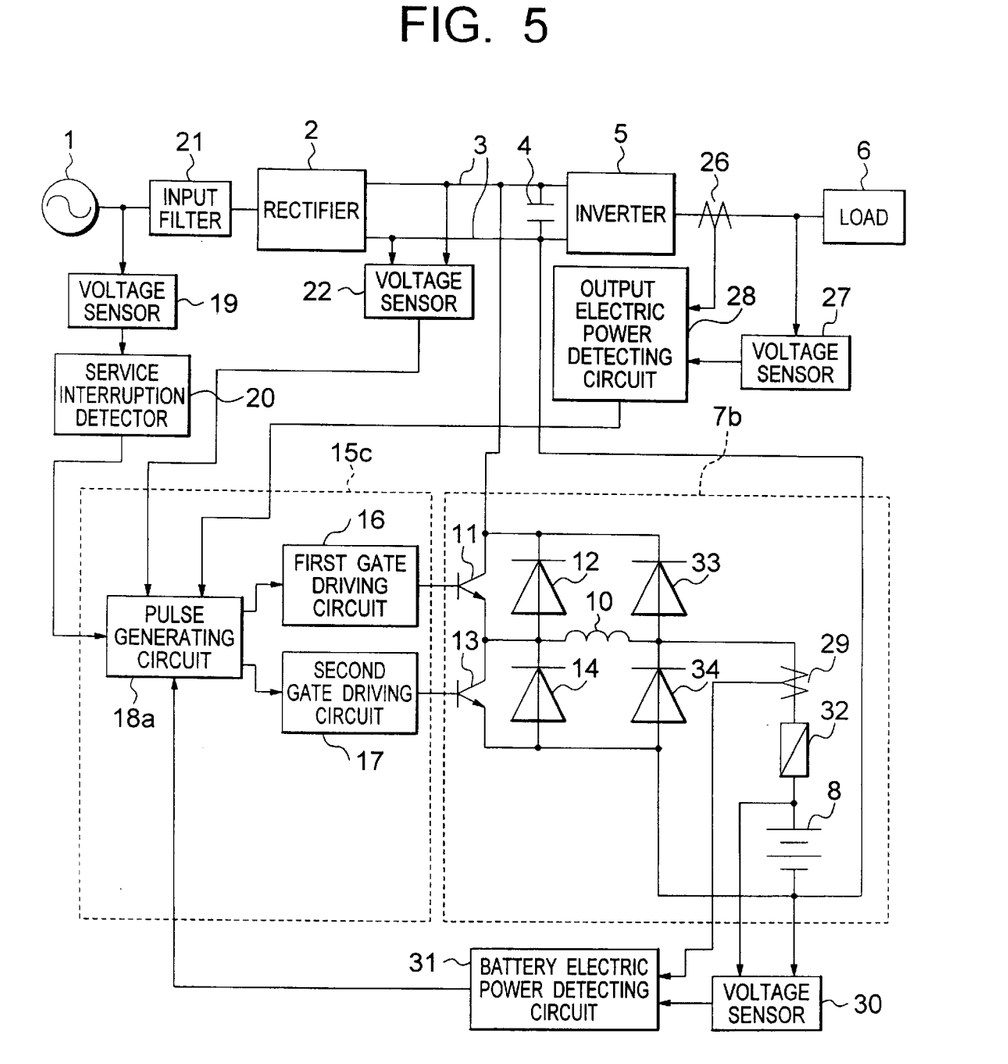
FIG. 5 is a circuit diagram, partly in block diagram, showing the configuration of a uninterruptive power supply according to a fifth embodiment of the present invention.

FIG. 5 is a circuit diagram, partly in block diagram, showing the configuration of a uninterruptive power supply according to the fifth embodiment of the present invention.

In FIG. 5, the same portions as those of the fourth embodiment shown in FIG. 4 are designated by the same reference numerals and the description thereof is omitted here for the sake of simplicity. As for new reference numerals, reference numerals 7b designates a stepup/stepdown chopper according to the fifth embodiment, and the stepup/stepdown chopper 7b further includes a fuse 32, as one of the switching means, which is provided between the batteries 8 and the chopper reactor 10 and which serves to carry out the protection against the overcurrent, and diodes 33 and 34, as the circulation means, which serves to make the current flowing due to the energy accumulated in the chopper reactor 10, when melting (opening) the fuse 32, circulate to the D.C. intermediate circuit 3.

As shown in FIG. 5, the battery output portion of the general uninterruptive power supply is provided with the fuse 32 for the protection against the overcurrent due to the accident or the like. Then, when no smoothing capacitor is provided, if the fuse 32 is blown when the current is being caused to flow through the chopper reactor 10, then the current is intended to be caused to flow continuously due to the energy accumulated in the chopper reactor 10, and hence the arc is generated across the fuse 32 to cause the calorification, which is dangerous. For this reason, the diodes 33 and 34 are provided in order to ensure the path through which the current flowing through the chopper reactor 10 is to be caused to flow continuously when the fuse 32 has been blown.

As a result, at the time when the fuse 32 has been blown during the discharge of the batteries 8, the current flowing due to the energy accumulated in the chopper reactor 10 circulates through the path of the D.C. intermediate circuit 3→the diode 34→the chopper reactor 10→the first free wheel diode 12→the D.C. intermediate circuit 3. On the other hand, at the time when the fuse 32 has been blown during the charge of the batteries 8, the current of the chopper reactor 10 circulates through the path of the D.C. intermediate circuit 3→the second free wheel diode 14→the diode 33→the D.C. intermediate circuit 3. Therefore, no arc is generated across the terminals of the fuse 32 and also the smoothing capacitor can be omitted. Therefore, the maintenance can be safely, readily carried out.

In this connection, while as the means for cutting off the current path of the chopper reactor 10, the description has been given with respect to the case where the fuse is blown, this is also applied to the circuit breaker or other switches. In addition, the stepup/stepdown chopper 7b which is configured as shown in FIG. 5 may also be similarly applied to the first to fourth embodiments shown in FIGS. 1 to 4, respectively.

(Sixth Embodiment)

While in the above-mentioned fifth embodiment, the description has been given with respect to the case where the capacitance component of the batteries 8 is so sufficiently large as to be able to smooth the voltage of the batteries 8, and hence the smoothing capacitor can be omitted, each of the charging current and the discharging current of the batteries 8 contains therein the ripple components due to the operation of the chopper. When no smoothing capacitor is provided, all of the ripple components are caused to flow into the batteries 8, and hence if the magnitude of each of the ripple components is large, this becomes the cause of degrading the batteries 8. In order to reduce each of the ripple components, the switching period of the chopper may be shortened or the inductance of the chopper reactor 10 may be increased. However, if the switching period is shortened, then the electric power loss due to the switching will be increased, while if the inductance of the chopper reactor 10 is increased, then since when preceeding from the charge to the discharge during the service interruption, it takes the discharging current of the batteries 8 time to flow by the corresponding electric power which needs to be supplied to the load 6, the supply of the electric power to the load 6 is stopped, or the capacitance value of the smoothing capacitor 4 needs to be increased. Therefore, this becomes expensive. In the sixth embodiment, the description will hereinbelow be given with respect to a uninterruptive power supply including a stepup/stepdown chopper in which the smoothing capacitor can be omitted and also each of the batteries can have the long life.

Figure 6:
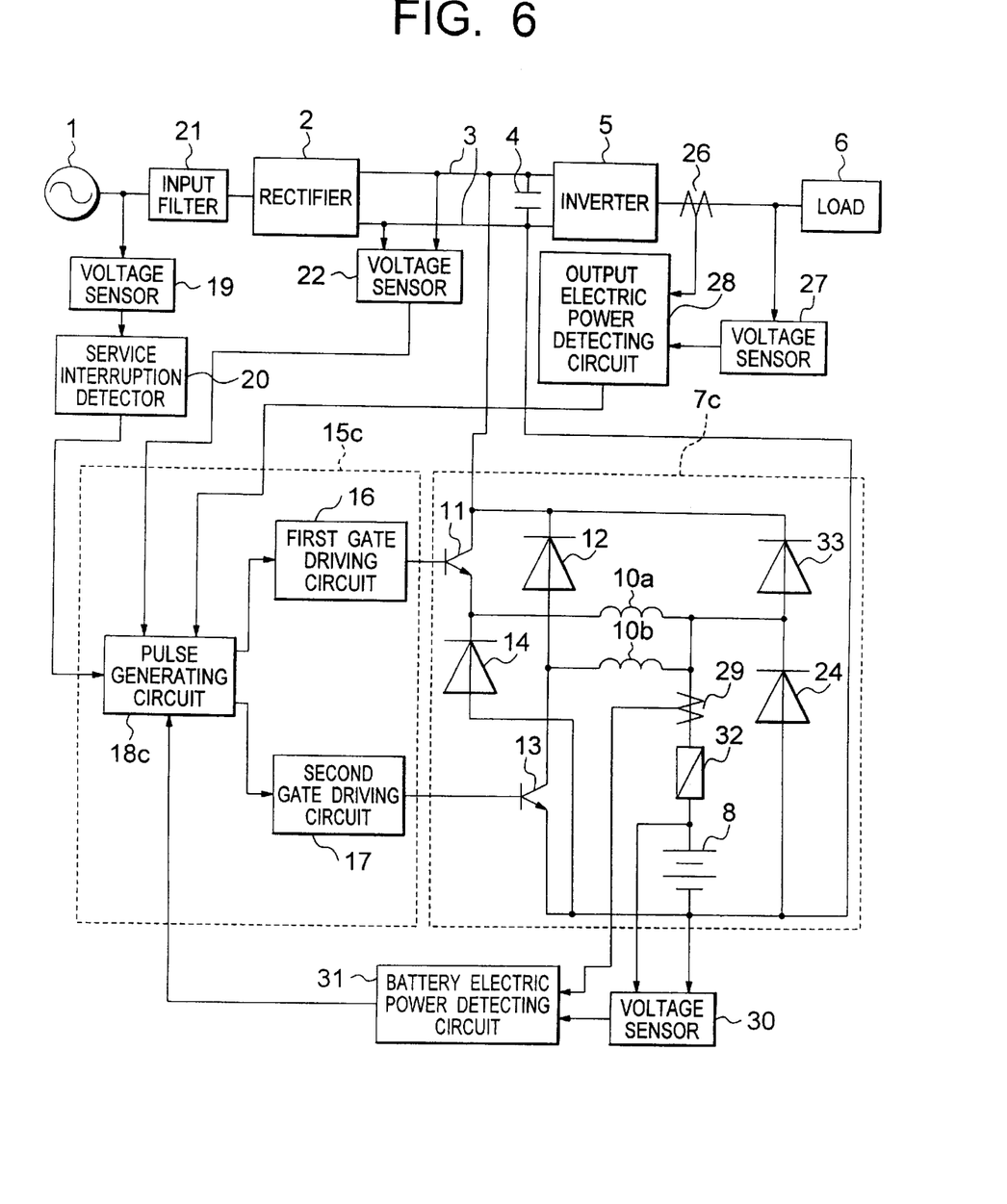
FIG. 6 is a circuit diagram, partly in block diagram, showing the configuration of a uninterruptive power supply according to a sixth embodiment of the present invention.

FIG. 6 is a circuit diagram, partly in block diagram, showing the configuration of a uninterruptive power supply according to the sixth embodiment of the present invention.

In FIG. 6, the same portions as those of the fifth embodiment shown in FIG. 5 are designated by the same reference numerals and the description thereof is omitted here for the sake of simplicity. As for new reference numerals, reference numerals 10a and 10b, as chopper reactors, designate respectively a charging chopper reactor which is provided in the charging path leading to the batteries 8, and a discharging chopper reactor which is provided in the discharging path leading to the D.C. intermediate circuit 3. In this connection, the inductance of the charging chopper reactor 10a is set to a large value, while the inductance of the discharging chopper reactor 10b is set to a small value.

As shown in FIG. 6, the chopper reactor is divided into the charging chopper reactor 10a and the discharging chopper reactor 10b, and the inductance of the charging chopper reactor 10a is set to a large value to reduce the ripple components of the charging current, while the inductance of the discharging chopper reactor 10b is set to a small value in such a way that the discharging current rises rapidly, whereby the smoothing capacitor can be omitted and also each of the batteries 8 can have the long life.

In this connection, while in the sixth embodiment 6, the chopper reactor 10 in the fifth embodiment shown in FIG. 5 is divided into the charging chopper reactor 10a and the discharging chopper reactor 10b, this can also be similarly implemented in the first to fourth embodiments shown in FIGS. 1 to 4, respectively.

As set forth hereinabove, according to the present invention, when the input electric power which has been inputted from the A.C. power source exceeds the electric power to be limited, the stepup/stepdown chopper is operated as the boosting chopper and a part of the electric power which is supplied from the inverter to the load is supplied from the batteries thereto, thereby suppressing the input electric power from the A.C. power source. Therefore, even if the consumed electric power of the load is increased, the voltage of the D.C. intermediate circuit is not decreased to the level lower than the setting voltage, and hence the input electric power from the A.C. power source can be limited to the level equal to or lower than the setting electric power.

In addition, since it is detected on the basis of the voltage detected by the D.C. intermediate circuit voltage detecting means that the input electric power which has been inputted from the A.C. power source exceeds the electric power to be limited, it can be readily detected that the input electric power exceeds the electric power to be limited. Also, even if the consumed electric power of the load is increased, the voltage of the D.C. intermediate circuit is not decreased to the level lower than the setting voltage and hence the input electric power from the A.C. power source can be limited to the level equal to or lower than the setting electric power.

In addition, since the input electric power is detected by multiplying the voltage detected by the D.C. intermediate circuit voltage detecting means by the current detected by the current detecting means and also it is detected on the basis of the detected electric power that the input electric power which has been inputted from the A.C. power source exceeds the electric power to be limited, even if the voltage of the A.C. power source fluctuates, the input electric power does not exceed the setting electric power and hence the input electric power from the A.C. power source can be limited.

In addition, since the input electric power is detected on the basis of the voltage detected by the D.C. intermediate circuit voltage detecting means, the voltage detected by the A.C. power source voltage detecting means and the impedance of the input filter and also it is detected on the basis of the detected electric power that the input electric power which has been inputted from the A.C. power source exceeds the electric power to be limited, the current detecting means becomes unnecessary and hence it is possible to obtain an inexpensive uninterruptive power supply.

In addition, the output voltages of the inverter and the batteries are respectively detected and also it is detected on the basis of the sum of the output electric power of the inverter and the output electric power of the batteries that the input electric power which has been inputted from the A.C. power source exceeds the electric power to be limited. Therefore, since the constituent elements for the measurement display or the control of the inverter are applied to the general uninterruptive power supply without adding any of new constituent elements, it can be readily detected with the simplified configuration that the input electric power exceeds the electric power to be limited. Also, even if the consumed electric power of the load is increased, the voltage of the D.C. intermediate circuit is not decreased to the level lower then the setting voltage and hence the input electric power from the A.C. power source can be limited to the level equal to or lower than the setting electric power.

In addition, since the switching means for the protection against the overcurrent is provided between the batteries and the chopper reactor and also the stepup/stepdown chopper having the circulation means for causing the current flowing due to the energy accumulated in the chopper reactor when opening the switching means to circulate to the D.C. intermediate circuit is provided, no arc is generated across the terminals of the switching means and hence the smoothing capacitor can be omitted. Therefore, the maintenance can be safely, readily carried out.

Furthermore, the stepup/stepdown chopper is provided having, as the chopper reactors, the charging chopper reactor provided in the charging path leading to the batteries and the discharging chopper reactor provided in the discharging path leading to the D.C. intermediate circuit, and the inductance of the charging chopper reactor is set to a large value, while the inductance of the discharging chopper reactor is set to a small value. Therefore, the inductance of the charging chopper reactor is set to a large value to reduce the ripple components of the charging current, and the inductance of the discharging chopper reactor is set to a small value to make the discharging current rise rapidly, whereby the smoothing capacitor can be omitted and also each of the batteries can have the long life.

While the present invention has been particularly shown and described with reference to the preferred embodiments, it will be understood to those skilled in the art that the various changes and modifications will occur without departing from the scope and true spirit of the invention. The scope of the invention is therefore to be determined solely by the appended claims.

What is claimed is:

1. An uninterruptable power supply comprising:
   an input filter for smoothing an A.C. current from an A.C. power source;
   a rectifier for converting an alternating current from said input filter into a direct current;
   a D.C. intermediate circuit receiving the direct current;
   an inverter for converting a direct current from said D.C. intermediate circuit into an alternating current supplied to a load;
   a chopper reactor;
   a stepup/stepdown chopper having batteries charged through said chopper reactor from said D.C. intermediate circuit, and discharged to said D.C. intermediate circuit through said chopper reactor;
   A.C. power source voltage detecting means for detecting voltage of the A.C. power source;
   service interruption detecting means for detecting a service interruption from the voltage detected by said voltage detecting means; and
   control means for operating said stepup/stepdown chopper as a stepdown chopper during non-interruption of the A.C. power source in response to by said service interruption detecting means to charge said batteries, for operating said stepup/stepdown chopper as a boosting chopper during a service interruption to supply the direct current to said D.C. intermediate circuit with the batteries as a D.C. power source, wherein said control means, when input electric power inputted from the A.C. power source exceeds an electric power limitation, operates said stepup/stepdown chopper as the boosting chopper to supply a part of the electric power supplied from said inverter to the load from said batteries, thereby reducing the input electric power from the A.C. power source.

2. The uninterruptable power supply according to claim 1, further comprising a D.C. intermediate circuit voltage detecting means for detecting a voltage across said D.C. intermediate circuit, wherein said control means detects, in response to the voltage detected by said D.C. intermediate circuit voltage detecting means, when the input electric power input from the A.C. power source exceeds the electric power limitation.

3. The uninterruptable power supply according to claim 1, further comprising:
   D.C. intermediate circuit voltage detecting means for detecting a voltage across said D.C. intermediate circuit, current detecting means for detecting current output by said rectifier, and input electric power detecting means for detecting the input electric power by multiplying the voltage detected by said D.C. intermediate circuit voltage detecting means by the current detected by said current detecting means, wherein said control means detects, the response to the electric power detected by said input electric power detecting means, when the input electric power input from the A.C. power source exceeds the electric power limitation.

4. The uninterruptable power supply according to claim 1, further comprising D.C. intermediate circuit voltage detecting means for detecting a voltage of the D.C. intermediate circuit, and input electric power detecting means for detecting the input electric power in response to the voltage detected by said D.C. intermediate circuit voltage detecting means, the voltage detected by said A.C. power source voltage detecting means, and impedance of said input filter, wherein the control means detects, in response to the input electric power detected by said input electric power detecting means, when the input electric power input from the A.C. power source exceeds the electric power limitation.

5. The uninterruptable power supply according to claim 1, further comprising:
   inverter output voltage detecting means for detecting output voltage of said inverter;
   inverter output current detecting means for detecting output current of said inverter;
   inverter output electric power detecting means for detecting output electric power of said inverter by multiplying the voltage detected by said inverter output voltage detecting means by the current detected by said inverter output current detecting means;
   battery output voltage detecting means for detecting output voltage of said batteries;
   battery output current detecting means for detecting output current of said batteries; and
   battery output electric power detecting means for detecting output electric power of said batteries by multiplying the voltage detected by said battery output voltage detecting means by the current detected by said battery output current detecting means, wherein said control means detects, in response to a sum of the electric power detected by said inverter output electric power detecting means and the electric power detected by said battery output electric power detecting means, when the input electric power input from the A.C. power source exceeds the electric power limitation.

6. The uninterruptable power supply according to claim 1, wherein said stepup/stepdown chopper includes switching means connected between said batteries and said chopper reactor for protection against an overcurrent, and circulation means for making a current which flows due to the energy accumulated in said chopper reactor upon opening of said switching means, circulate through said D.C. intermediate circuit.

7. The uninterruptable power supply according to claim 1, wherein said stepup/stepdown chopper includes, as said chopper reactor, a charging chopper reactor in a charging path leading to said batteries and a discharging chopper reactor in a discharging path leading to said D.C. intermediate circuit, wherein said charging chopper reactor has a first inductance and said discharging chopper reactor has a second inductance smaller than the first inductance.

* * * * *